July 28, 1936.  C. ROEHRICH  2,048,816
APPARATUS FOR THE PRODUCTION OF LENS LINE
SCREEN FILMS FOR COLOR PHOTOGRAPHY
Filed Jan. 18, 1932
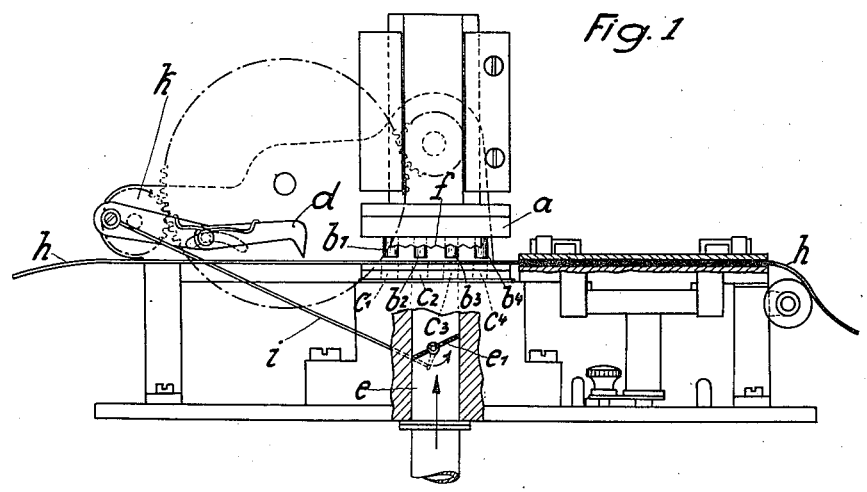
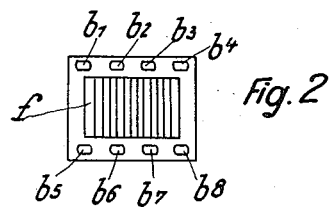
Inventor:
Carl Roehrich
By
Attorney.

UNITED STATES PATENT OFFICE 2,048,816

APPARATUS FOR THE PRODUCTION OF LENS LINE-SCREEN FILMS FOR COLOR PHOTOGRAPHY

Carl Roehrich, Berlin, Germany

Application January 18, 1932, Serial No. 587,374
In Germany April 22, 1931

3 Claims. (Cl. 18—1)

In the manufacture of lens line-screen films for color photography, the usual procedure hitherto has been to roll along the film surface, under suitable pressure, an impressing roller provided on the surface with narrow helical lines and capable of being heated for the purpose of providing upon the material suitable for photographic surfaces, a profiled surface required for refraction.

This process, however, is only sufficient when producing recording material for color photography by the lens line-screen process. This process could only be extensively used for amateur purposes, and in fact for narrow films, since it has hitherto not been possible to produce proofs from the negative provided with a lens line screen, or from the positive obtained from this negative by means of the photographic reversing process.

The main difficulty arises in the reproduction, that is to say, in the duplicating of the negative or positive provided on the surface with a lens line screen, owing to the fact that the line screen absolutely must be brought precisely into that position, in relation to the image layer, which it had when the photograph was taken. This is essential, since with the lens line-screen films for color photography, the blackening of the images and the elementary lenses produced by the profiling on the surface of the films stand in quite a definite relationship to one another, the blackenings of the negative corresponding to the image, thrown by each individual elementary lens, of the three-color filter arranged in the plane of the diaphragm. The same condition must however also be fulfilled on the positive film, that is to say, in copying, the corresponding color components must be produced by the lenses of the positive film, upon the light-sensitive layer, in order that the copy obtained may render at all possible in projection a color reproduction resembling the original picture.

Since it has been found impossible, by means of the usual contact-copying process, to produce copies resembling the original, attempts have been made to attain this object by employing optical means. Here again, however, great difficulties were encountered, so that the copying of lens line-screen films must be regarded as not having been hitherto completely solved.

The essential object of the present invention is to eliminate these difficulties. This result is obtained by the lens screen or elementary lenses being given absolutely the same position on every section of the image, both of the negative and of the positive.

This result is obtained according to the invention owing to the fact that the line screen is impressed individually not by means of a roller as hitherto, but image by image by means of an impressing stamp containing the profile of the particular line screen, first on the negative and then on the positive to be copied therefrom, before or after the copying.

By this means the result is in the first place obtained that in every section of the image the position of the refraction elements is absolutely the same. Exact registering is also obtained more particularly by virtue of the fact that either simultaneously with the impressing of the lens line screen, the perforating of the particular field of view is effected in such a way that either the impressing stamp is directly or positively connected with the punch employed for perforating cinematograph films to produce the perforations required for the feeding thereof, or else that the requisite agreement between the lens line screen and the perforating is maintained by other mechanical means. Only in this way is it possible to impress upon the images already completely copied and developed the lens line screen exactly in the same position as in the original.

Any shrinkage of the supporting material of the line-screened and exposed film during or after the development may be allowed for by adjusting the impressing of the positive film. In case of need it is even possible to employ, for the impressing of the positive film, impressing stamps somewhat modified in their dimensions, which will allow for the shrinkage of the supporting material.

A line screening of the film according to the invention with impressing stamps also presents the advantage that that part of the film upon which the so-called image-separating mark falls, remains without line screening, as does also the space for the sound record. The stability of the films is thereby considerably enhanced, and warping or curvature of the films, which would produce disturbing refractions during projection, and would thereby falsify the colors, are accordingly prevented.

In order to ensure that the portion of film to be impressed will lie absolutely flat, and to prevent it from sticking to the impressing stamp, when the latter is removed from the film, there are in the film-supporting surface facing the impressing stamp a number of holes, which are connected with an air-suction device. This device prevents the film from being carried along with the impressing stamp owing to it sticking to the latter after impressing, and thereby impairing the accurate registration of the next impression. This suction device acts only at intervals during and shortly after the impressing of the film portions, and stops during the feeding of the film. This result is obtained by positively connecting a valve with the film-feeding device.

The invention is illustrated in one constructional form by way of example in the accompanying drawing, in which Figure 1 shows diagrammatically in side elevation, partly in section, the combined impressing and perforating device according to the invention.

Figure 2 shows a detail of the impressing stamp, and

Figure 3 shows on an enlarged scale the impression on a strip of film.

$a$ is the impressing stamp, and $b^1$, $b^2$, $b^3$, $b^4$ and so forth are the punches for perforating the necessary holes. $c^1$, $c^2$, $c^3$, $c^4$ and so forth are guides for the perforating punches in the supporting surface for the film $h$. $d$ is the feeding device for the film, and $e$ a duct for the suction means. A valve $e^1$ in the suction device is actuated by a rod $i$, which is connected with an eccentric $k$, which effects the stepwise feeding of the film strip $h$ by means of the feeding device $d$. When the feeding device is being actuated, therefore, the valve of the suction device is positively closed and this device is put out of action.

Figure 2 shows the lower impressing surface of the impressing stamp $a$ provided with the line screen. $f$ is the said surface, with the screening, and $b^1$ to $b^8$ are the perforating punches connected with the impressing stamp or the support thereof.

Figure 3 shows on an enlarged scale the impression upon the strip of film $h$. $f$ is the lens line screen, and $g^1$, $g^2$ and $g^3$ are the marks of separation, which have remained without line screens.

I claim:

1. Apparatus for the production of lens line-screen films for color cinematography, comprising a matrix for impressing refraction elements, such as lens line screens, upon each picture section of a strip of cinematographic film separately, punches for forming feeding perforations along the edges of the strip of film, means for positively maintaining a definite operative relationship between the matrix and the punches, a perforated supporting surface for the punches, a perforated supporting surface for supporting each section of a strip of film in turn while the said section is being impressed and perforated, and a suction device adapted to produce a partial vacuum intermittently underneath the supporting surface and thereby to hold the film still while the impressing matrix is being withdrawn from it after impressing the refraction elements thereon.

2. Apparatus for the production of lens line-screen films for color cinematography, comprising a matrix for impressing refraction elements, such as lens line screens, upon each picture section of a strip of cinematographic film separately, punches for forming feeding perforations along the edges of the strip of film, means for positively maintaining a definite operative relationship between the matrix and the punches, a perforated supporting surface for supporting each section of a strip of film in turn while the said section is being impressed and perforated, a suction device adapted to produce a partial vacuum underneath the supporting surface and thereby to hold the film still while the impressing matrix is being withdrawn from it after impressing the refraction elements thereon, means for feeding the strip of film forward between the production of each two consecutive impressions, and means for destroying the partial vacuum underneath the supporting surface during the feeding of the strip of film.

3. Apparatus for the production of lens line-screen films for color cinematography, comprising a matrix for impressing refraction elements, such as lens line screens, upon each picture section of a strip of cinematographic film separately, punches for forming feeding perforations along the edges of the strip of film, means for positively maintaining a definite operative relationship between the matrix and the punches, a perforated supporting surface for supporting each section of a strip of film in turn while the said section is being impressed and perforated, a suction device adapted to produce a partial vacuum underneath the supporting surface and thereby to hold the film still while the impressing matrix is being withdrawn from it after impressing the refraction elements thereon, means for feeding the strip of film forward between the production of each two consecutive impressions, a valve adapted when closed to prevent the suction device from producing a partial vacuum underneath the supporting surface, and means for positively maintaining a definite operative relationship between the film feeding means and the valve.

CARL ROEHRICH.